US009955369B2

(12) United States Patent
Chen et al.

(10) Patent No.: US 9,955,369 B2
(45) Date of Patent: Apr. 24, 2018

(54) NETWORK SELF-HEALING METHOD AND SYSTEM USING LIGHTING DEVICES

(71) Applicant: ZHEJIANG SHENGHUI LIGHTING CO., LTD, Jiaxing (CN)

(72) Inventors: Chuang Chen, Jiaxing (CN); Hui Wu, Jiaxing (CN); Xingming Deng, Jiaxing (CN); Jinxiang Shen, Jiaxing (CN)

(73) Assignee: ZHEJIANG SHENGHUI LIGHTING CO., LTD, Zhejian (CN)

( * ) Notice: Subject to any disclaimer, the term of this patent is extended or adjusted under 35 U.S.C. 154(b) by 122 days.

(21) Appl. No.: 15/025,493

(22) PCT Filed: Apr. 21, 2015

(86) PCT No.: PCT/CN2015/077070
§ 371 (c)(1),
(2) Date: Mar. 28, 2016

(87) PCT Pub. No.: WO2016/041350
PCT Pub. Date: Mar. 24, 2016

(65) Prior Publication Data
US 2016/0219447 A1    Jul. 28, 2016

(30) Foreign Application Priority Data

Sep. 15, 2014 (CN) .......................... 2014 1 0469731

(51) Int. Cl.
*H04W 24/04* (2009.01)
*H04W 40/12* (2009.01)
(Continued)

(52) U.S. Cl.
CPC .......... *H04W 24/04* (2013.01); *H04W 40/12* (2013.01); *H04L 2012/2841* (2013.01); *H04W 84/18* (2013.01); *H04W 84/20* (2013.01)

(58) Field of Classification Search
None
See application file for complete search history.

(56) References Cited

U.S. PATENT DOCUMENTS 7,813,326 B1 * 10/2010 Kelm ...................... H04L 45/08
370/238
2011/0211517 A1 * 9/2011 Moscibroda .......... H04H 20/63
370/312
(Continued)

FOREIGN PATENT DOCUMENTS

CN         103369790 A      10/2013
CN         103442410 A  * 12/2013 ............ H04W 24/04
(Continued)

OTHER PUBLICATIONS

The World Intellectual Property Organization (WIPO) International Search Report for PCT/CN2013/077070 dated Jul. 10, 2015.

*Primary Examiner* — Chirag Shah
*Assistant Examiner* — Srinivasa Reddivalam
(74) *Attorney, Agent, or Firm* — Anova Law Group, PLLC

(57) ABSTRACT

The present invention provides a network self-healing method and system using lighting devices each including a WI-FI module with a wireless access point (AP) function. The lighting devices are wirelessly connected to a wireless router. The lighting devices scan a service set identifier (SSID) of the wireless router to confirm that the wireless router is not able to be connected to and to switch to a self-healing networking mode. The wireless AP function of each lighting device is activated according to a self-healing networking rule. One lighting device is selected from the lighting devices and is used as a first lighting device router. The wireless AP function of each of other non-selected lighting devices remaining in the plurality of lighting
(Continued)

devices is deactivated, and wirelessly connected to the first lighting device router respectively.

20 Claims, 2 Drawing Sheets

(51) Int. Cl.
*H04W 84/20* (2009.01)
*H04L 12/28* (2006.01)
*H04W 84/18* (2009.01)

(56) References Cited

U.S. PATENT DOCUMENTS

| | | | | |
|---|---|---|---|---|
| 2012/0275490 | A1* | 11/2012 | Courtice | H04W 40/28 375/133 |
| 2012/0278389 | A1* | 11/2012 | Thangadorai | H04W 84/20 709/204 |
| 2013/0173811 | A1* | 7/2013 | Ha | H04W 76/02 709/227 |
| 2014/0169212 | A1* | 6/2014 | Villasenor | H04W 28/18 370/254 |
| 2014/0177469 | A1* | 6/2014 | Neyhart | H04L 12/2807 370/254 |
| 2015/0146705 | A1* | 5/2015 | Kwon | H04W 4/008 370/338 |
| 2015/0350993 | A1* | 12/2015 | Kasten | H04W 48/16 370/332 |
| 2016/0021611 | A1* | 1/2016 | Wong | H04W 56/001 370/311 |

FOREIGN PATENT DOCUMENTS

| | | | |
|---|---|---|---|
| CN | 103986630 A | 8/2014 | |
| CN | 104301917 A | 1/2015 | |
| JP | 2007310862 A | 11/2007 | |
| JP | 2015515048 A | 5/2015 | |
| KR | 20090123923 A | 12/2009 | |
| WO | WO 2008121621 A1 * | 10/2008 | H04W 48/08 |
| WO | 2011158512 A1 | 12/2011 | |

* cited by examiner

US 9,955,369 B2

NETWORK SELF-HEALING METHOD AND SYSTEM USING LIGHTING DEVICES

CROSS-REFERENCES TO RELATED APPLICATIONS

This application is a national stage application under 35 USC § 371(c) of PCT Application No. PCT/CN2015/077070, entitled "Network Self-healing Method and System using Lighting Devices" filed on Apr. 21, 2015, which claims the priority of Chinese Patent Application No. 201410469731.0, filed on Sep. 15, 2014. The entire disclosure and contents of the above applications are hereby incorporated by reference herein.

FIELD OF THE DISCLOSURE

The present disclosure relates to the field of lighting technologies and, more particularly, relates to a self-healing method and system for network anomalies using lighting devices.

BACKGROUND

Lighting devices often use various light sources to provide comfortable and pleasant environment with good visibility for work, living, and/or other specific purposes. Nowadays, lighting devices have become more and more intelligent. In a smart home, a lighting device may include a wireless communication module to connect to a home network through a wireless router, enabling lighting control through the home network. Therefore, lighting devices becomes a part of smart devices in a smart home environment, bringing unique smart experience to users and creating comfortable living environment.

WI-FI (Wireless-Fidelity) technology enables personal computers, hand-held devices (such as personal digital assistants (PDAs), or mobile phones) and other smart terminals to interconnect with each other wirelessly. With continued popularity and development of wireless network technologies, the wireless network coverage has become broad. In a certain area, a wireless network may employ a wireless access point (AP) to perform communications between a terminal and a wired local area network. An AP can facilitate a wireless workstation to access a wired local network, as well as facilitate a wired local network to access a wireless station. Within a coverage area of the AP, a terminal, either a mobile terminal or a stationary terminal, can detect and receive a wireless signal, and obtain an SSID (Service Set Identifier) of the wireless AP, therefore accessing the network through the wireless AP.

In a smart home environment, lighting devices may be connected to a router through WI-FI and access the home network. A control terminal may perform smart control on the lighting devices through the router. However, the home network may be unstable. For example, when the performance of the router is unstable and a malfunction occurs, the lighting devices in the home environment may be disconnected and may lose control, which affects lighting and user experience. Therefore, it is desirable to provide a self-healing method to reestablish the network when there is a network anomaly.

The disclosed method and system are directed to solve one or more problems set forth above and other problems in the art.

BRIEF SUMMARY OF THE DISCLOSURE

One aspect of the present disclosure provides a network self-healing method using a plurality of lighting devices. Each lighting device includes a WI-FI module with a wireless access point (AP) function. The plurality of lighting devices is wirelessly connected to a wireless router. The plurality of lighting devices scans a service set identifier (SSID) of the wireless router to confirm that the wireless router is not able to be connected to and to switch to a self-healing networking mode. The wireless AP function of each lighting device is activated according to a self-healing networking rule. One lighting device is selected from the plurality of lighting devices and is used as a first lighting device router. The wireless AP function of each of other non-selected lighting devices remaining in the plurality of lighting devices is deactivated, and wirelessly connected to the first lighting device router respectively.

Another aspect of the present disclosure provides a network self-healing system using lighting devices. The system includes a plurality of lighting devices and a wireless router configured to wirelessly connect to the plurality of lighting devices. Each lighting device includes a WI-FI module with a wireless AP function. When the wireless router cannot be connected to, the plurality of lighting devices switches to a self-healing networking mode to activate the wireless AP function of each lighting device. One lighting device is selected from the plurality of lighting devices according to a self-healing networking rule and the selected lighting device is used as a lighting device router. Each of other non-selected lighting devices is configured to deactivate the wireless AP function to wirelessly connect to the lighting device router respectively.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
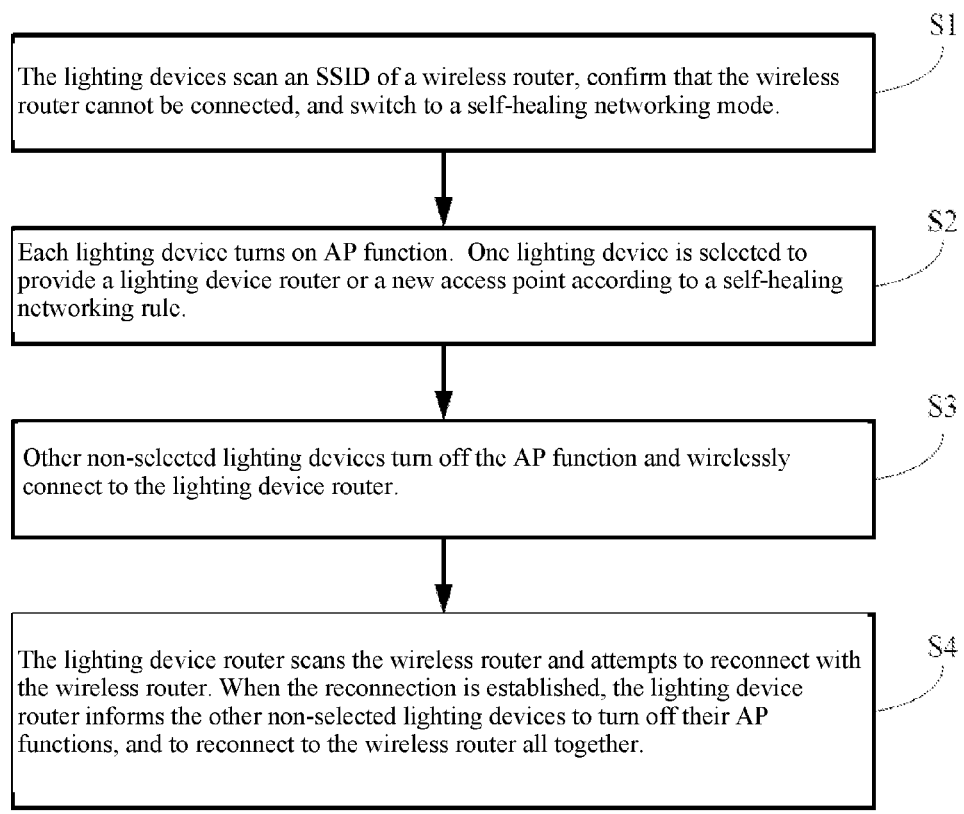
FIG. 1 is a flow chart illustrating an exemplary self-healing method for correcting network anomalies using lighting devices consistent with the present disclosure.

As shown in FIG. 1, the present disclosure provides a plurality of lighting devices consistent with various disclosed embodiments. Each lighting device is configured to include a WI-FI module having a wireless access point. The plurality of the lighting devices may wirelessly connect to a wireless router. When the wireless router is abnormal and/or cannot be connected to otherwise, the present disclosure provides a self-healing method to overcome network anomalies.

In Step S1 of FIG. 1: each lighting device may scan an original wireless router and may confirm that it cannot connect to this original wireless router. The lighting devices may then switch to a self-healing networking mode.

In Step S2: each lighting device may turn on an AP function. One of the lighting devices may be selected from the plurality of lighting devices each having the AP function turned on as a new router (also referred to as a "lighting device router" a "new or next lighting device router" or a "first lighting device router") according to a self-healing networking rule.

In Step S3, other non-selected lighting devices (other than the selected one lighting device used as the new lighting device router) may in response turn off their AP functions, and wirelessly connect to the new lighting device router (i.e., the selected lighting device having the AP function on or activated) respectively.

In Step S4, the new lighting device router may scan the original wireless router and attempt to establish a connection with the original wireless router. When the reconnection is established between the new lighting device router and the original wireless router, all other non-selected lighting devices may be informed, e.g., by the new lighting device router. The new lighting device router may then turn off the AP function, and reconnect to the original wireless router together with the other non-selected lighting devices. In this manner, all of the plurality of lighting devices is re-connected to the original wireless router.

In certain embodiments, in Step S4, the new lighting device router may scan the original wireless router at a time interval of about 20 to about 40 seconds. For example, the scan interval may be about 30 seconds. When an SSID (Service Set Identifier) of the original wireless router is successfully scanned, the new lighting device router may attempt to reconnect with the original wireless router.

Further, when the new lighting device router obtained in Step S3 cannot be connected with the original wireless router, Step S1 to S4 may be repeated to select another lighting device from the plurality of lighting devices to perform the self-healing networking tasks and to provide another new lighting device router, which is also referred to as a "second lighting device router."

To identify the second lighting device router, the disclosed method may be repeated. For example, in Step 51, the plurality of lighting devices may scan the SSID of the original wireless router. When the SSID of the original wireless router cannot be successfully scanned, e.g., for a continuous scanning of a certain period of time, it is confirmed that the original wireless router cannot be connected to and the plurality of lighting devices may switch to the self-healing networking mode. Such continuous scanning of the time period may be about 3 seconds to about 10 seconds. In the case that the original wireless router cannot be connected after such continuous scanning, it is confirmed that the original wireless router cannot be connected to and the plurality of lighting devices may switch to the self-healing networking mode. In various embodiments, the lighting devices may be configured to scan the original wireless router for different time durations according to practical needs.

In one embodiment, the self-healing networking rule described in Step S2 may include: sequentially selecting a lighting device from the plurality of lighting devices as a new lighting device router, according to a customized, preset routing table.

In another embodiment, the self-healing networking rule disclosed herein may include: selecting a lighting device having a largest or a smallest MAC (Media Access Control) address among all of the plurality of lighting devices as a new lighting device route. Each lighting device may have a corresponding MAC address name contained in its own SSID. Thus, the value of the largest or a smallest MAC address may be determined by comparing the SSIDs.

In other embodiments, the self-healing networking rule may adopt a self-routing protocol for networking. In one example of the self-healing networking rule, a common routing protocol may be modified to allow the lighting devices to accommodate the needs for self-networking. For example, DSDV (Destination Sequenced Distance Vector) protocol is established by modifying a commonly used RIP protocol. In another example of the self-healing networking rule, an on-demand routing rule may be used. Instead of maintaining a routing table by periodically broadcasting routing information, a routing request for establishing a routing may only be sent when needed, such that network consumption is effectively reduced. Typical examples may include dynamic source routing, AODV (Ad-hoc On-demand Distance Vector), etc. In another example of the self-healing networking rule, a routing based on Quality of Service (QoS) may be used. According to collected network resource situations (not the usually used "jumping figure"), nodes of the lighting devices may select a lighting device that is most likely to satisfy user's QoS requirement as the new lighting device router, such as an LS-QoS (Link State-QoS).

In various embodiments, the plurality of lighting devices may be controlled by a smart terminal that is wirelessly connected to the original wireless router. Therefore, in Step S3, the smart terminal, together with the other non-selected lighting devices, may be simultaneously and respectively connected to the new lighting device router. When the original wireless router is successfully reconnected, the smart terminal may then be reconnected to the original wireless router.

Figure 2:
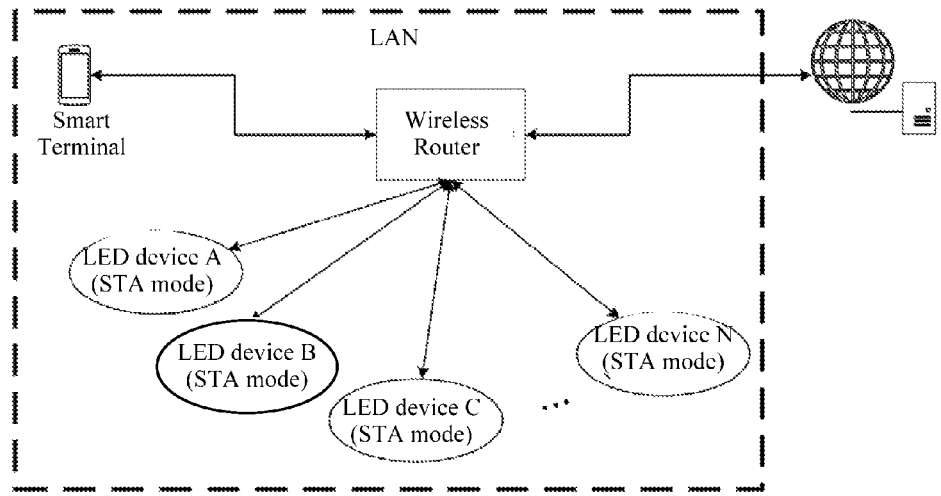
FIG. 2 is a structure diagram illustrating an exemplary self-healing system for correcting network anomalies using lighting devices consistent with the present disclosure.

FIG. 2 illustrate an exemplary self-healing system for correcting network anomalies using lighting devices consistent with various embodiments of the present disclosure. The exemplary self-healing system may include a wireless router, a smart terminal having wireless communication capabilities, and a plurality of lighting devices. Each lighting device may include a WI-FI module with wireless AP functions. In certain embodiments, the lighting devices may be LED (Light Emitting Diode) lighting devices. The smart terminal may be any smart devices having wireless communication capabilities, such as a smart phone, a laptop computer, a tablet computer, a PDA, a smart watch, etc. In one embodiment, the smart terminal may be a smart phone.

In an exemplary embodiment, a plurality of LED lighting devices may connect to an (original) wireless router respectively. A smart phone may wirelessly connect to the wireless router and control the LED lighting devices through the wireless router. When the wireless router is behaving abnormally and cannot be connected to, one new LED lighting device among all the LED lighting devices may be selected as a new lighting device router according to a self-healing networking rule. The smart phone and the other non-selected LED lighting devices (except for the selected LED lighting device) may respectively and wirelessly connect to the new lighting device router (i.e., the selected LED lighting device).

As disclosed, various self-healing networking rules may be used herein. For illustration purposes, the self-healing networking rules by comparing values of MAC addresses of the LED lighting devices are primarily described for the network self-healing systems. In this example, an LED lighting device with the smallest MAC address is selected to be the new lighting device router. The networking process may include the following exemplary process.

When the wireless router is operating normally, the wireless router wirelessly connects to a plurality of LED lighting devices, including LED lighting device A, LED lighting device B, LED lighting device C, . . . , and LED lighting device N. These LED lighting devices may include AP functions. These LED lighting devices may have their AP functions in an OFF or deactivated status. These LED lighting devices may also be in a STA (station) working mode. The smart terminal may control the LED lighting devices by wirelessly connecting to the wireless router. Meanwhile, the wireless router may connect to the Internet or a cloud server to receive a remote control signal to control the LED lighting devices. The smart terminal may also access the Internet by wirelessly connecting to the wireless router.

When the wireless router disappears from the network or cannot be properly connected to, all the LED lighting devices may switch to a self-healing networking mode. That is, all the LED lighting devices may activate the AP functions. All of the LED lighting devices may be configured to have a unified name prefix when naming their SSIDs. For example, the name prefix may be a unified user name or vendor name, such as Sengled. The SSIDs may have suffixes named after last four digits of the MAC address. For example, when the last four digits of the MAC addresses are AAAA, AAAB and AAAC, the SSIDs may be named as Sengled_AAAA, Sengled_AAAB, and Sengled_AAAC.

Figure 3:
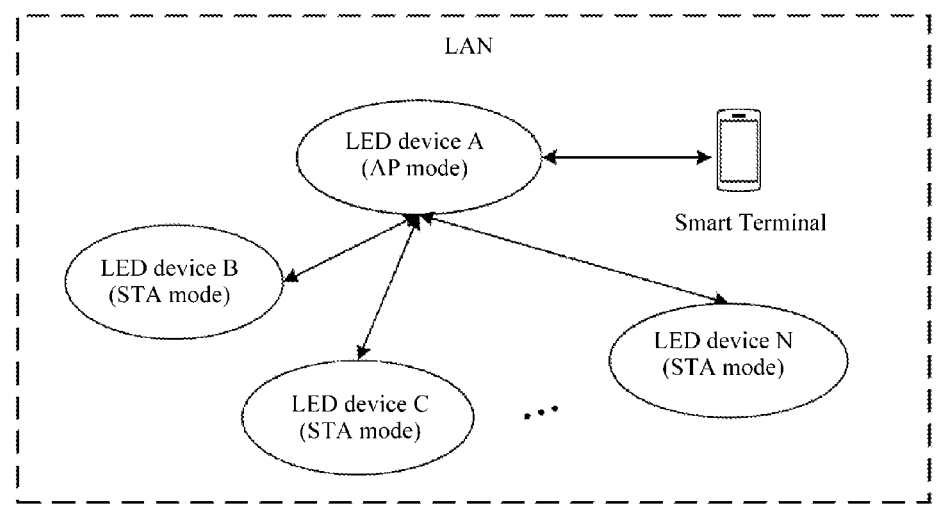
FIG. 3 is another structure diagram illustrating an exemplary self-healing system for correcting network anomalies using lighting devices consistent with the present disclosure.

As shown in FIG. 3, LED lighting device A with the smallest MAC address may be selected to be the lighting device router or a new access point. The LED lighting device A may keep the AP activated or at an ON state. The other non-selected LED lighting devices may be switched to the STA working mode and, using a preset public password. The other LED lighting devices may access Sengled_AAAA (e.g., LED lighting device A). The smart terminal may control all the LED lighting devices in a network provided by the LED lighting device A, including controlling LED lighting device A itself.

When the original wireless router is in use, the original wireless router may connect to the Internet, so that the LED lighting devices may be controlled remotely. The smart phone may also access the Internet through the original wireless router. When the original wireless router cannot be connected to, the LED lighting devices may perform self-healing networking tasks to provide a new lighting device router or a new access point and to establish a new local area network (LAN). The smart terminal may connect to the new lighting device router or access point and to control the LED lighting devices in the LAN. When the selected LED lighting device, i.e., the new lighting device router or access point, also malfunctions and cannot be connected, all the remaining LED lighting devices may activate their AP functions to repeat the self-healing networking process, and to select an LED lighting device with the smallest MAC address to provide another new lighting device router or access point, ensuring a stable network for controlling the LED lighting devices.

In some embodiments consistent with the present disclosure, network self-healing functions may be incorporated with the LED lighting settings to indicate the network status to a user. For example, when the original WI-FI router cannot be connected to, the LED lighting device incorporating the WI-FI router may flash or change the lighting into a different color to indicate that the WI-FI router has gone down. When a new lighting device router is selected, the lighting device may also set the LED lighting (of all or a few lighting devices) on a different color or flash to indicate that the new lighting device will function as the router of the network.

The lighting adjustments associated with various network self-healing functions may also be customized by a user through a smart phone. For example, a user may use a control program on a smartphone connected to the lighting devices to set all the LED lighting devices to generate an orange colored light for a short time (e.g., 5 seconds) when an original lighting device with the WI-FI router cannot be connected to anymore. When a new lighting device is selected to act as the new router, the use may use a control program to set all the LED lighting devices to generate a green colored light for a short time (e.g., 5 seconds).

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides a self-healing method and system for network anomalies using lighting devices. The lighting devices can establish a self-healing network and prevents losing control on the lighting devices when a wireless router malfunctions or when connection line has problems. After confirming that the original wireless router cannot be connected, each lighting device may turn on the AP function. One lighting device may be selected to be a new lighting device router (or a new access point) according to a self-healing networking rule. When a lighting device is selected, the other non-selected lighting devices (except for the selected lighting device) may turn off their AP functions and wirelessly connect to the new lighting device router or access point respectively. The selected lighting device may act as a center to establish a new network.

Self-healing networking method can handle network anomalies with flexibility, maintain network stability and ensure lighting controls in an effective and timely manner, providing a reliable and comfortable environment for home living.

What is claimed is:

1. A network self-healing method using lighting devices, comprising:
providing a plurality of lighting devices, each lighting device including a WI-FI module with a wireless access point (AP) function, wherein the plurality of lighting devices is wirelessly connected to a wireless router;
scanning, by each of the plurality of lighting devices, a service set identifier (SSID) of the wireless router to confirm that the wireless router is not able to be connected to and to switch to a self-healing networking mode;
activating the wireless AP function of each of the plurality of lighting devices, selecting one lighting device from the plurality of lighting devices according to a self-healing networking rule associated with the plurality of lighting devices, and using the selected lighting device as a first lighting device router;
indicating that the selected lighting device is the first lighting device router by changing a lighting setting of the selected lighting device; and
deactivating the wireless AP function of each of other non-selected lighting devices remaining in the plurality of lighting devices, and wirelessly connecting the other non-selected lighting devices to the first lighting device router respectively.

2. The method according to claim 1, after the step of wirelessly connecting the other non-selected lighting devices to the first lighting device router, further comprising:
scanning the wireless router by the first lighting device router and attempting to reconnect to the wireless router;
if the first lighting device router is successfully connected to the wireless router, informing the other non-selected lighting devices remaining in the plurality of lighting devices;
turning off the wireless AP function of the first lighting device router; and re-connecting the first lighting device router together with the other non-selected lighting devices to the wireless router.

3. The method according to claim 2, wherein:
the first lighting device router scans the wireless router at a preset time interval; and
if the SSID of the wireless router is successfully scanned, the first lighting device router attempts to connect to the wireless router.

4. The method according to claim 2, further comprising:
if the first lighting device router is not able to be connected to, repeating the method to re-select another one lighting device from the plurality of lighting devices as a second lighting device router for self-healing networking.

5. The method according to claim 1, wherein:
in the step of scanning, by each of the plurality of lighting devices, the SSID of the wireless router, if the SSID of the wireless router is not successfully scanned after a continuous scanning for a first preset time duration by the plurality of lighting devices, the wireless router is confirmed that cannot be connected, and the self-healing networking mode is switched.

6. The method according to claim 1, wherein:
in the step of scanning, by each of the plurality of lighting devices, the SSID of the wireless router, if the SSID of the wireless router is successfully scanned but the wireless router is not able to be connected after continuous attempts for a second preset time duration, the wireless router is confirmed that cannot be connected, and the self-healing networking mode is switched.

7. The method according to claim 5, wherein:
the first preset time duration is from about 5 seconds to 10 seconds.

8. The method according to claim 1, wherein:
the self-healing networking rule includes: selecting the one lighting device sequentially from the plurality of lighting devices as the first lighting device router according to a routing table.

9. The method according to claim 1, wherein:
each lighting device corresponds to a Media Access Control (MAC) address; and
the self-healing networking rule includes selecting the one lighting device having the values of a largest or a smallest MAC address from the plurality of the lighting devices as the first lighting device router.

10. The method according to claim 9, wherein:
an SSID of each lighting device contains an MAC address name; and
the largest or the smallest MAC address is determined by comparing values of the SSIDs of the plurality of lighting devices.

11. The method according to claim 1, wherein:
the self-healing networking rule includes adopting a self-routing protocol for self-networking and modifying a commonly-used routing protocol to allow the plurality of lighting devices to accommodate the self-networking.

12. The method according to claim 1, wherein:
the self-healing networking rule includes a self-networking routing protocol based on quality of service (QoS); and
according to collected network resource information from each lighting device, the one lighting device that satisfies most of user's QoS requirements is selected as the first lighting device router.

13. The method according to claim 1, wherein:
the self-healing networking rule includes an on-demand routing rule; and
instead of maintaining a routing table by periodically broadcasting routing information, a routing request for establishing a routing is sent only when needed to effectively reduce network consumption.

14. The method according to claim 2, wherein:
a smart terminal is wirelessly connected to the wireless router and controls the plurality of lighting devices; and
if the wireless router cannot be connected, the smart terminal together with the other non-selected lighting devices are connected to the first lighting device router.

15. The method according to claim 14, wherein the step of re-connecting the first lighting device router together with the other non-selected lighting devices to the wireless router comprises:
wirelessly re-connecting the smart terminal to the wireless router.

16. The method according to claim 3, wherein:
the preset time interval is from 20 seconds to 40 seconds.

17. A network self-healing system, comprising:
a plurality of lighting devices, each lighting device including a WI-FI module with a wireless AP function; and
a wireless router wirelessly connected to the plurality of lighting devices, wherein:
if each of the plurality of lighting devices scan a service set identifier (SSID) of the wireless router and confirms that the wireless router is not able to be connected to, each of the plurality of lighting devices switches to a self-healing networking mode to activate the wireless AP function of each of the plurality of lighting devices, one lighting device is selected from the plurality of lighting devices according to a self-healing networking rule associated with the plurality of lighting devices, and the selected lighting device is used as a lighting device router, the selected lighting device is configured to indicate that the selected lighting device is the lighting device router by changing a lighting setting of the selected lighting device, and each of other non-selected lighting devices is configured to deactivate the wireless AP function to wirelessly connect to the lighting device router respectively.

18. The system according to claim 17, further comprising:

a smart terminal having wireless communication capabilities;

wherein:
- the smart terminal is configured to wirelessly connect to the wireless router and control the plurality of lighting devices; and
- if the wireless router cannot be connected, the smart terminal is configured to wirelessly connect to the lighting device router.

19. The system according to claim 17, wherein:
the lighting devices are LED lighting devices.

20. The system according to claim 18, wherein:
the smart terminal is a smart phone, a laptop computer, a tablet computer, a PDA (Personal Digital Assistant) or a smart watch.

* * * * *